(12) United States Patent
Kuenzi et al.

(10) Patent No.: US 10,791,444 B2
(45) Date of Patent: Sep. 29, 2020

(54) CAPTURING USER INTENT WHEN INTERACTING WITH MULTIPLE ACCESS CONTROLS

(71) Applicant: Carrier Corporation, Jupiter, FL (US)

(72) Inventors: Adam Kuenzi, Silverton, OR (US); Michael Lang, Oregon City, OR (US)

(73) Assignee: Carrier Corporation, Palm Beach Gardens, FL (US)

(*) Notice: Subject to any disclaimer, the term of this patent is extended or adjusted under 35 U.S.C. 154(b) by 544 days.

(21) Appl. No.: 15/528,896

(22) PCT Filed: Dec. 1, 2015

(86) PCT No.: PCT/US2015/063138
§ 371 (c)(1),
(2) Date: May 23, 2017

(87) PCT Pub. No.: WO2016/089837
PCT Pub. Date: Jun. 9, 2016

(65) Prior Publication Data
US 2017/0330226 A1  Nov. 16, 2017

Related U.S. Application Data

(60) Provisional application No. 62/086,266, filed on Dec. 2, 2014.

(51) Int. Cl.
*G07C 9/00* (2020.01)
*G06Q 30/02* (2012.01)
(Continued)

(52) U.S. Cl.
CPC .......... *H04W 4/70* (2018.02); *G06Q 30/0251* (2013.01); *G07C 9/00174* (2013.01);
(Continued)

(58) Field of Classification Search
CPC ......... H04W 4/70; H04W 4/80; H04W 12/06; H04W 12/08; H04W 48/08; H04W 48/10;
(Continued)

(56) References Cited

U.S. PATENT DOCUMENTS 6,717,528 B1 * 4/2004 Burleson ................ G08C 17/02
340/12.22
7,315,823 B2    1/2008 Bröndrup
(Continued)

FOREIGN PATENT DOCUMENTS

CN     103021054 A    4/2013
CN     103026682 A    4/2013
(Continued)

OTHER PUBLICATIONS

Mexican Office Action dated Jan. 10, 2019 issued in corresponding Mexican Patent Application No. MX/a/2017/007294.
(Continued)

*Primary Examiner* — Edwin C Holloway, III
(74) *Attorney, Agent, or Firm* — Bachman & LaPointe, P.C.

(57) ABSTRACT

A method of advertisement filtering including receiving Bluetooth Low Energy (BTLE) advertisements from a multiple of access controls; filtering the received Bluetooth Low Energy (BTLE) advertisements based on a credential on the mobile device; comparing the filtered received Bluetooth Low Energy (BTLE) advertisements; and determining a user intent to access a particular access control in response to the comparing.

14 Claims, 7 Drawing Sheets

(51) Int. Cl.
*H04W 12/08* (2009.01)
*H04W 12/06* (2009.01)
*H04W 4/70* (2018.01)
*H04W 4/80* (2018.01)
*H04W 4/02* (2018.01)

(52) U.S. Cl.
CPC ..... *G07C 9/00571* (2013.01); *G07C 9/00896* (2013.01); *H04W 4/025* (2013.01); *H04W 4/80* (2018.02); *H04W 12/06* (2013.01); *H04W 12/08* (2013.01); *G07C 2009/00769* (2013.01); *G07C 2209/63* (2013.01)

(58) Field of Classification Search
CPC .............. H04W 4/23; H04W 12/003; H04W 12/00407; H04W 12/00409; H04W 12/00503; G06Q 30/0251; G07C 9/00174; G07C 2009/00769; G07C 2209/63; G07C 9/00103; G07C 9/00904
USPC ........................................................ 340/5.7
See application file for complete search history.

(56) References Cited

U.S. PATENT DOCUMENTS

| | | | |
|---|---|---|---|
| 7,821,395 | B2 | 10/2010 | Denison et al. |
| 9,210,170 | B1 | 12/2015 | Kim et al. |
| 9,600,949 | B2 | 3/2017 | Conrad et al. |
| 9,613,226 | B2 | 4/2017 | Khassanov et al. |
| 9,691,201 | B2 | 6/2017 | Myers et al. |
| 2003/0093997 | A1 | 5/2003 | Stalder et al. |
| 2008/0139116 | A1* | 6/2008 | Balgard ................ G08C 17/02 455/41.2 |
| 2008/0163361 | A1 | 7/2008 | Davis et al. |
| 2009/0066476 | A1 | 3/2009 | Raheman |
| 2009/0256676 | A1 | 10/2009 | Piccirillo et al. |
| 2010/0176919 | A1 | 7/2010 | Myers et al. |
| 2010/0283579 | A1* | 11/2010 | Kraus ................ G07C 9/00944 340/5.7 |
| 2010/0306549 | A1 | 12/2010 | Ullmann |
| 2011/0311052 | A1* | 12/2011 | Myers ................ G07C 9/00103 380/270 |
| 2012/0129451 | A1 | 5/2012 | Métivier |
| 2012/0146918 | A1* | 6/2012 | Kreiner ............... H04M 1/7253 345/173 |
| 2012/0154108 | A1* | 6/2012 | Sugaya ............... H04N 21/4126 340/5.1 |
| 2012/0157080 | A1 | 6/2012 | Métivier |
| 2012/0201381 | A1 | 8/2012 | Miller et al. |
| 2012/0213362 | A1 | 8/2012 | Bliding et al. |
| 2012/0280783 | A1* | 11/2012 | Gerhardt ............ G07C 9/00309 340/5.6 |
| 2013/0127593 | A1 | 5/2013 | Kuenzi et al. |
| 2013/0176107 | A1* | 7/2013 | Dumas ............... G07C 9/00571 340/5.61 |
| 2013/0200999 | A1 | 8/2013 | Spodak et al. |
| 2013/0257589 | A1 | 10/2013 | Mohiuddin et al. |
| 2013/0335193 | A1 | 12/2013 | Hanson et al. |
| 2013/0342314 | A1 | 12/2013 | Chen et al. |
| 2014/0028438 | A1 | 1/2014 | Kuenzi et al. |
| 2014/0049364 | A1* | 2/2014 | Ahearn .............. G07C 9/00309 340/5.51 |
| 2014/0049370 | A1 | 2/2014 | Eberwine et al. |
| 2014/0051425 | A1 | 2/2014 | Ahearn et al. |
| 2014/0120905 | A1 | 5/2014 | Kim |
| 2014/0145823 | A1 | 5/2014 | Aase |
| 2014/0181508 | A1 | 6/2014 | Tanizawa et al. |
| 2014/0181955 | A1 | 6/2014 | Rosati |
| 2014/0219453 | A1 | 8/2014 | Neafsey et al. |
| 2014/0247111 | A1 | 9/2014 | Elfstrom et al. |
| 2014/0373111 | A1 | 12/2014 | Moss et al. |
| 2014/0376747 | A1* | 12/2014 | Mullet .................. G08C 23/00 381/110 |
| 2015/0170448 | A1 | 6/2015 | Robfogel et al. |
| 2015/0199863 | A1 | 7/2015 | Scoggins et al. |
| 2015/0221152 | A1 | 8/2015 | Andersen |
| 2015/0228134 | A1* | 8/2015 | Tehranchi ........... G07C 9/00111 340/5.61 |
| 2015/0269797 | A1* | 9/2015 | Kauffmann ........ G07C 9/00309 340/5.61 |
| 2016/0014131 | A1 | 1/2016 | Neafsey et al. |
| 2016/0036788 | A1 | 2/2016 | Conrad et al. |
| 2016/0036814 | A1 | 2/2016 | Conrad et al. |
| 2016/0049024 | A1* | 2/2016 | Johnson ................ H04W 4/029 340/5.7 |
| 2017/0255768 | A1 | 9/2017 | Goh et al. |
| 2017/0311161 | A1 | 10/2017 | Kuenzi |
| 2017/0345237 | A1 | 11/2017 | Kuenzi et al. |

FOREIGN PATENT DOCUMENTS

| | | |
|---|---|---|
| CN | 203361799 U | 12/2013 |
| CN | 104063930 A | 9/2014 |
| EP | 2 620 919 A1 | 7/2013 |
| MX | 2017001090 A | 7/2017 |
| WO | 2013/074301 A1 | 5/2013 |

OTHER PUBLICATIONS

Mexican Office Action dated Jan. 10, 2019 issued in corresponding Mexican Patent Application No. MX/a/2017/007292.
U.S. Office Action dated Feb. 25, 2019 issued in corresponding U.S. Appl. No. 15/528,887.
Chinese Office Action dated Mar. 21, 2019 for corresponding Chinese Patent Application 201580065827.3.
Chinese Office Action dated Mar. 29, 2019 for corresponding Chinese Patent Application 201580066030.5.
Chinese Office Action dated Mar. 29, 2019 for corresponding Chinese Patent Application 201580065881.8.
U.S. Non-Final Office Action dated Apr. 24, 2019 for U.S. Appl. No. 15/528,820.
U.S. Office Action dated Aug. 29, 2019 for corresponding U.S. Appl. No. 15/528,820.
International search report for Application No. PCT/US2015/063138 dated Feb. 24, 2016.
Mexican Office Action dated Oct. 17, 2019 issued for corresponding Mexican Patent Application No. MX/a/2017/007292.
European Office Action dated Nov. 22, 2019 issued for corresponding European Patent Application No. 15816969.8.
Chinese Office Action dated Nov. 4, 2019 issued for Chinese Patent Application No. 201580065827.3.
Chinese Office Action dated Mar. 4, 2020 issued for Chinese Patent Application No. 201580065872.9.

* cited by examiner

CAPTURING USER INTENT WHEN INTERACTING WITH MULTIPLE ACCESS CONTROLS

CROSS-REFERENCE TO RELATED APPLICATION

Benefit is claimed of U.S. Provisional Patent Application No. 62/086,266, filed Dec. 2, 2014, and entitled "Capturing User Intent When Interacting With Multiple Access Controls", the disclosure of which is incorporated by reference herein in its entirety as if set forth at length.

BACKGROUND

The present disclosure relates generally to access control systems, and more particularly, to a system and a method of capturing user intent when interacting with multiple access controls.

An access control system is typically operated by encoding data on a physical key card that indicates access rights. Some access control systems are online where the reader can use some means to communicate with the access control system. In online systems the access rights are usually a reference identifier. Other access control systems are offline and the access rights are encoded as data that can be decoded and interpreted by the offline lock to retrieve the access rights. An example is a hotel locking system where a front desk encodes a guest card and an offline, battery powered lock on a guest room door has the means to decode the key card and permit or deny access based on the encoded access rights. Some methods of encoding access rights include sequencing where subsequent access rights have a sequence number that is greater than the prior access rights.

Various mobile devices have been utilized to open locks via an infrared 'beam' to the lock, which provides directionality, or a 'push the button' on the box to wake up the lock for subsequent communication over Bluetooth. With the capability present in Bluetooth Low Energy (BTLE) to communicate with very low power, new system architectures require the lock to be 'always on' and sending periodic BTLE advertisements, such as once per second. The very low power requirements result in many years of battery life. With this setup, a user would not need to 'push a button' to wake the lock up—it is already awake, however, in environments where there are multiple locks within range of the mobile device such as in a Hotel, each user may receive the advertisement from a significant number of locks thereby complicating the capture of user intent.

SUMMARY

A method of advertisement filtering according to one disclosed non-limiting embodiment of the present disclosure includes receiving advertisements from each of a multiple of access controls on a mobile device; filtering the received advertisements based on a credential on the mobile device; comparing the filtered received advertisements; and determining a user intent to access a particular access control in response to the comparing.

A further embodiment of the present disclosure includes, wherein the access control is a lock.

A further embodiment of any of the foregoing embodiments of the present disclosure includes, wherein the mobile device is a smartphone.

A further embodiment of any of the foregoing embodiments of the present disclosure includes, further comprising sorting the filtered received advertisements based on a RSSI (received signal strength indicator).

A further embodiment of any of the foregoing embodiments of the present disclosure includes sorting the filtered received advertisements based on a locationing system separate from the advertisement where the precise location and distance relative to the access control is known A further embodiment of any of the foregoing embodiments of the present disclosure includes sorting the filtered received advertisements based on a direction of the mobile device.

A further embodiment of any of the foregoing embodiments of the present disclosure includes determining the direction by a compass on the mobile device.

A further embodiment of any of the foregoing embodiments of the present disclosure includes determining the direction via triangulation with dual Bluetooth antennas on the mobile device.

A further embodiment of any of the foregoing embodiments of the present disclosure includes presenting the filtered received advertisements as a list on the mobile device for selection by the user.

A further embodiment of any of the foregoing embodiments of the present disclosure includes permitting scrolling of the list and selecting from the list based on gesturing with the mobile device A further embodiment of any of the foregoing embodiments of the present disclosure includes permitting filtering of the received advertisements by the altitude of the mobile device A further embodiment of any of the foregoing embodiments of the present disclosure includes sorting the list based on one or more categories.

A further embodiment of any of the foregoing embodiments of the present disclosure includes sorting the list based on a prior selection.

A further embodiment of any of the foregoing embodiments of the present disclosure includes sorting the list based on the last access control opened.

A further embodiment of any of the foregoing embodiments of the present disclosure includes providing additional information to the mobile device to facilitate identification of the access control.

A further embodiment of any of the foregoing embodiments of the present disclosure includes, wherein the additional information includes information from a NFC (Near Field Communication) tag.

A further embodiment of any of the foregoing embodiments of the present disclosure includes, wherein the NFC (Near Field Communication) tag is associated with an access control.

A further embodiment of any of the foregoing embodiments of the present disclosure includes, wherein the mobile device reads the list audibly A further embodiment of any of the foregoing embodiments of the present disclosure includes wherein the mobile device determines the access control by voice commands from the user.

A further embodiment of any of the foregoing embodiments of the present disclosure includes, wherein the additional information includes information from a barcode or QR code.

An access control system according to one disclosed non-limiting embodiment of the present disclosure includes a multiple of access controls; and a mobile device in communication with the multiple of access controls, the mobile device operable to determine a user intent to access a particular access control of the multiple of access controls.

A further embodiment of any of the foregoing embodiments of the present disclosure includes, wherein determining the user intent includes using a direction of the mobile device.

A further embodiment of any of the foregoing embodiments of the present disclosure includes, wherein determining the user intent includes using a compass of the mobile device.

A further embodiment of any of the foregoing embodiments of the present disclosure includes, wherein determining the user intent includes presenting a list on the mobile device.

A further embodiment of any of the foregoing embodiments of the present disclosure includes, wherein the list is sorted based on the last access control opened.

A further embodiment of any of the foregoing embodiments of the present disclosure includes, wherein determining the user intent includes filtering a multiple received advertisements from the multiple of access controls based on a credential on the mobile device.

A further embodiment of any of the foregoing embodiments of the present disclosure includes a NFC (Near Field Communication) tag associated with each access control, the NFC tag in communication with the mobile device.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
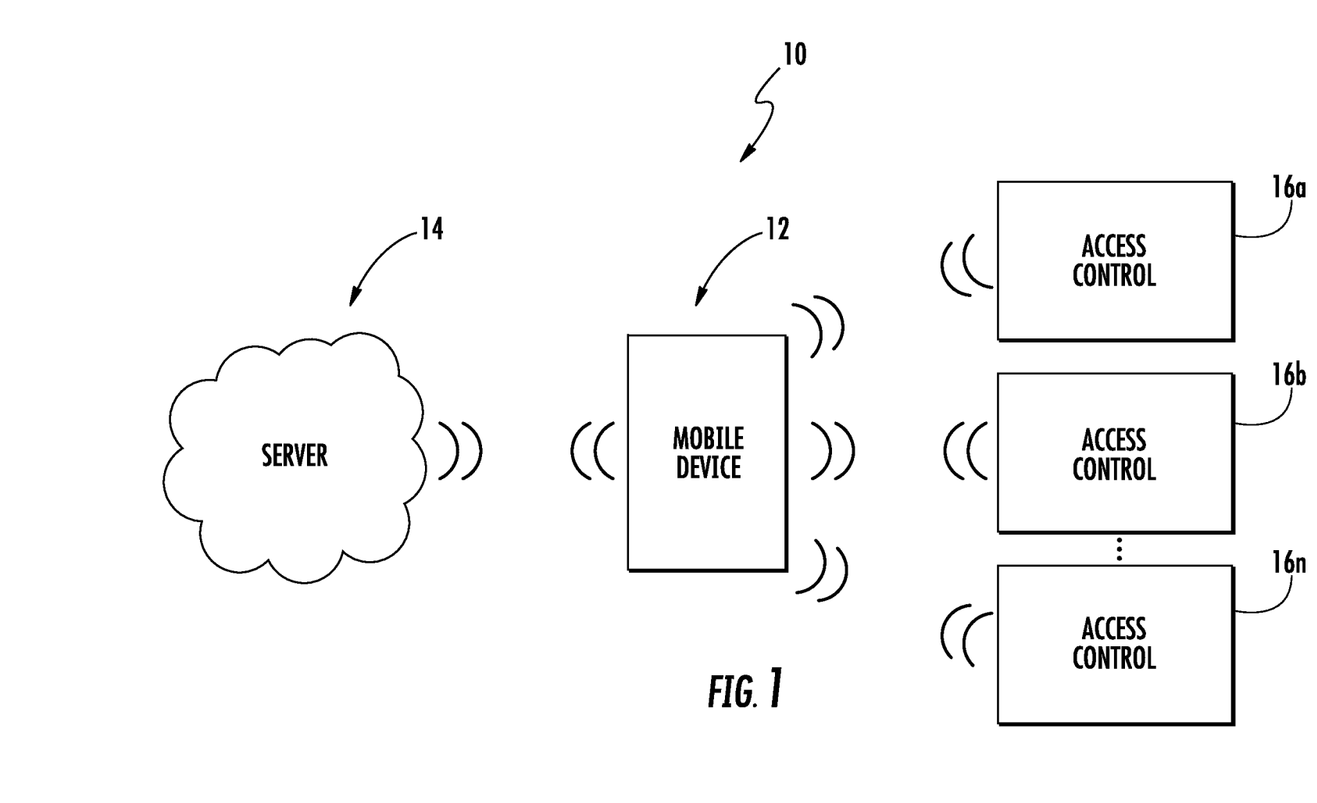
FIG. 1 is a general schematic system diagram of a user authentication system.

FIG. 1 schematically illustrates an access control system 10. The system 10 generally includes a mobile device 12, a server 14, and a plurality of access controls 16, schematically illustrated as 16a, 16b, . . . , 16n. It should be appreciated that, although particular systems are separately defined in the schematic block diagrams, each or any of the systems may be otherwise combined or separated via hardware and/or software.

The mobile device 12 is a wireless capable handheld device such as a smartphone, that is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential. A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
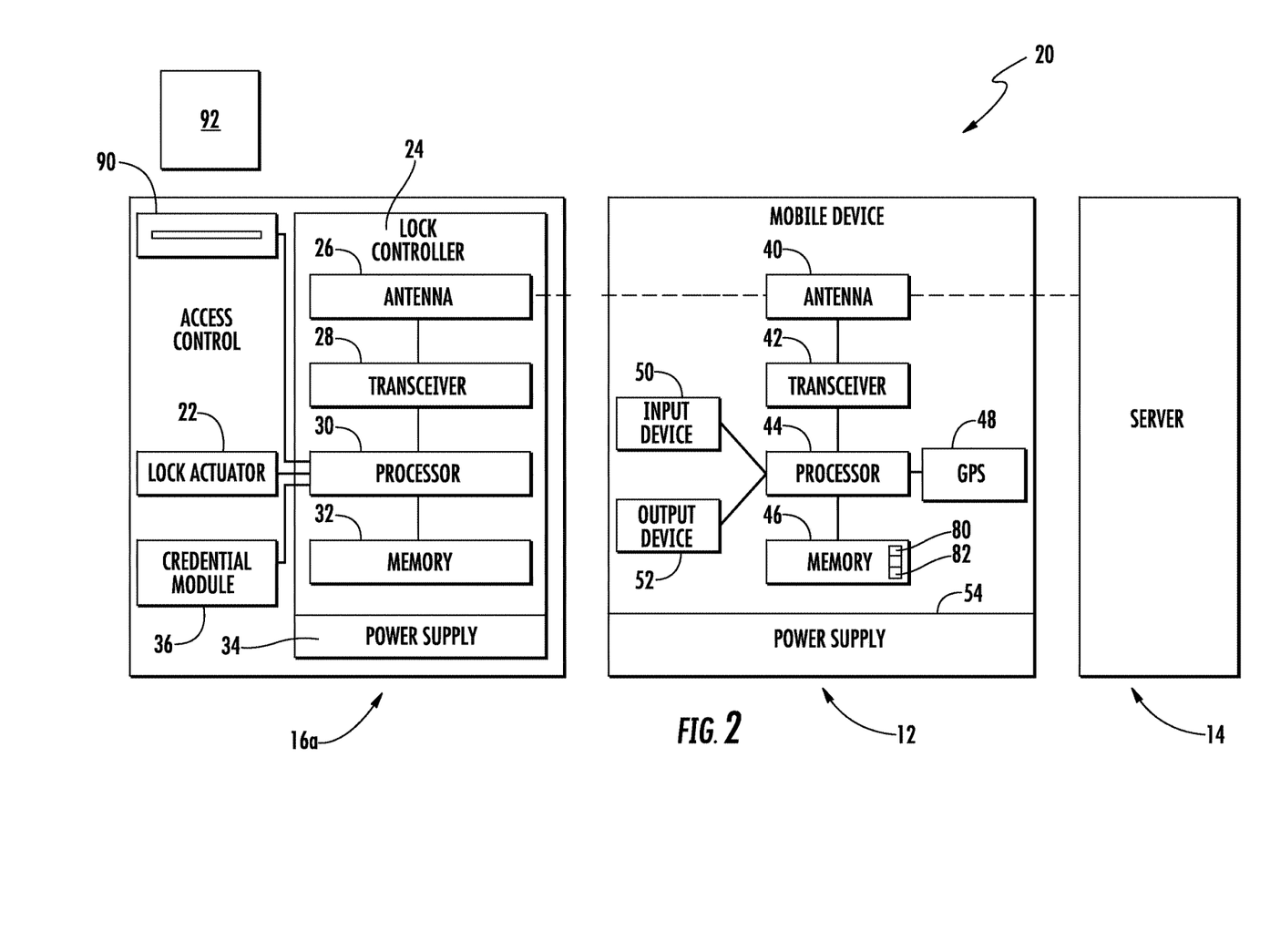
FIG. 2 is a block diagram of the user authentication system.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and may, for example, be the lock of a lockbox, a door lock, or a lock core. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26.

While the figure shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16a. This is the online configuration and in this embodiment a mobile credential is retrieved in real time and is passed to the credential module 36 without storing first in the key memory 46 on the mobile device 12.

Figure 3:
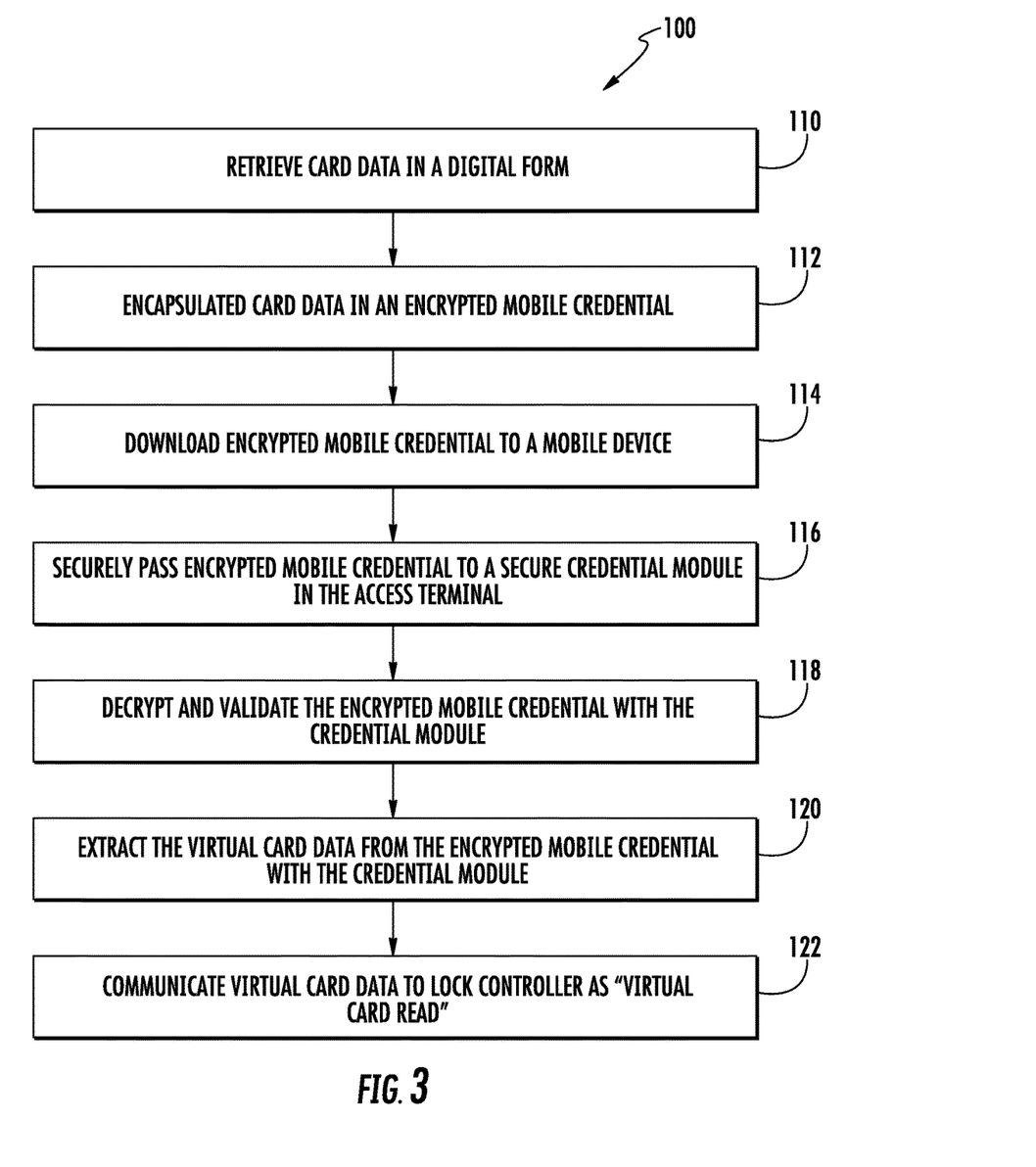
FIG. 3 is a flowchart of a credential management method performed by the user authentication system.

With reference to FIG. 3, a method 100 to facilitate communication of a credential representative of data that would normally be physically encoded on the key card 92 is retrieved in a digital form (step 110), encapsulated in an encrypted credential (step 112), downloaded to the mobile device 12 (step 114), securely passed to the credential module 36 (step 116) that decrypts and validates the credential (step 118), extracts the virtual card data (step 120), then passes the virtual card data into the lock controller 24 as a "virtual card read" (step 122). This, for example, permits a user to bypass a front desk of a hotel and go directly to their room as will be further described. The encrypted credential may be generated by the server 14 using well known techniques for digital certificate creation and encryption using cryptographic algorithms such as AES, ECC, RSA, and the like. For example, the credential may contain but is not limited to including a credential identifier, a parameter indicating the type or format of the credential, it may contain encrypted data such as the virtual card data, and it may contain a digital signature. The encrypted data may be encrypted with an AES-128 encryption key that can be known to the credential module 36. Or it may be encrypted with a derived encryption key that can be determined from information contained in the credential. Further, the digital signature may be a CBC-MAC type signature based on an AES-128 encryption key, for example, that can be known by the credential module 36. Or, it could be a digital signature based on a private key known to the server 14 and can be validated by a public key known to the credential module 36.

Figure 4:
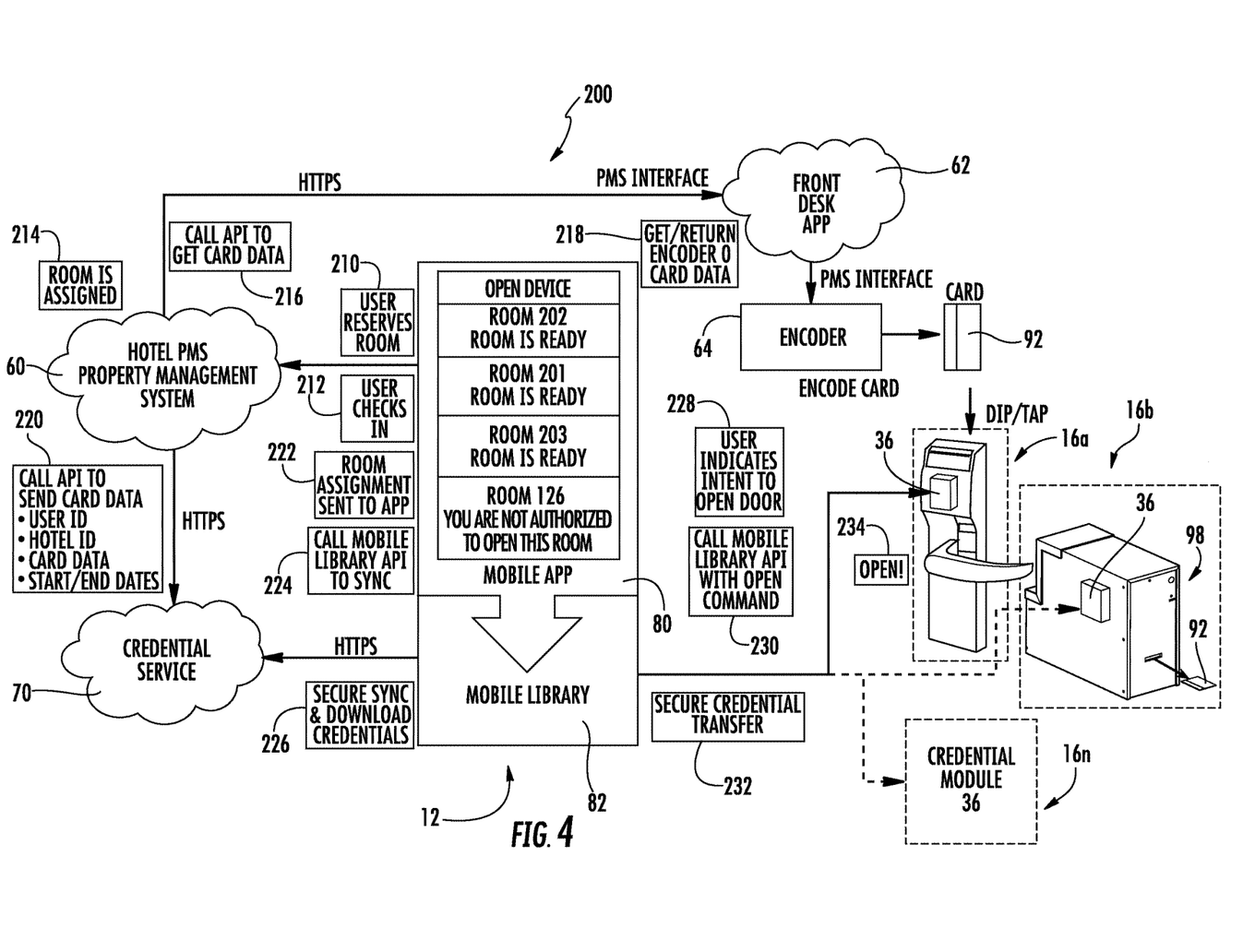
FIG. 4 is a flowchart of a credential management method performed by the user authentication system according to one disclosed non-limiting embodiment.

With reference to FIG. 4, one example bypass the front desk method 200, is initiated by a user who first reserves a hotel room (step 210) through any process supported by a hotel, such as mobile reservations, web sites, travel agents, etc. Later, a check-in procedure confirms their stay (step 212). Again, this can be performed through any process supported by the hotel.

Next, a room is assigned in a hotel property management system 60 based on the guest preferences (or room selection) and the room availability on check-in (step 214). The hotel property management system 60 may use a software-to-software application programming interface (API) provided by a front desk application 62 to request card data in a digital form (step 216). The front desk application 62 may range from a stand-alone encoder 64 to a complete software package running in a cloud that is operable to encode a virtual card for the room that was selected and return the virtual card data back to the hotel system (step 218).

Next, the hotel property management system 60 will make another software-to-software API call to a credential service 70 after the hotel system has authenticated the user and has allocated a room stay reservation (step 220). The pertinent information is communicated to the credential service 70 with an indication to include, for example, what hotel property, what room, what guest (e.g. User ID)—what dates and also the virtual card data for the stay.

Simultaneous, or in sequence with sending the virtual card data to the credential service 70, the hotel property management service 60 communicates an indication to the user (again, through any conventional method) that the check-in is confirmed and the room is assigned (step 222).

Next, a mobile device 12 based hotel loyalty mobile application 80 will utilize a software-to-software API in a mobile library 82 (step 224) to download credentials from the credential service 70 (step 226). The mobile library 82 will securely authenticate to the credential service 70 with a prior established shared secret that may change on every successful connection.

Once authenticated, the credential service 70 generates at the time of the communication from the mobile library 82 the credentials for the user and encrypts into the credentials the virtual card data received in step 220 for the guest associated with this instance of the mobile library. One credential is generated for each door or access point and the virtual card data will be the same in each of these separate credentials, but may be encrypted with a unique key for the particular door or access point. The method of encryption may be AES, 3DES, or other such encryption method. The method and type of credential used may be a compressed digital certificate or a standard based certificate like X.509 or other certificate format known to the art. That is, for example, the virtual card data is encrypted into the credential with a unique key known by the credential module 36 and by the credential service 70.

The mobile library 82 will download and store the list of credentials on the mobile device 12 using native OS protections and additional encryption of data with device specific information, e.g., UDID, IMEI, IMSI, MAC addresses, etc. Now that the check-in is complete and the encrypted mobile credential (with virtual card data) is resident on the mobile device 12 (FIG. 2), the user can operate the access control 16 in an offline mode at any later time without the mobile device 12 being required to be connected to the credential service 70. Additional embodiments may have the mobile device 12 download a credential at the same time mobile device is communicating to access control 16 at the same time the user wishes to access their room, for example.

When the user wishes to access their room (step 228), the user indicates such intent through a gesture, a click of a button, a tap on the screen, a finger print read, password, proximity to the lock, touching the lock, etc. In response to this, intent, the hotel loyalty mobile application 80 again calls the software-to-software API in the mobile library 82 to initiate the secure transfer of the encrypted mobile credential to the access control 16 (step 230). While the loyalty application 80 initiates the transfer, the mobile library implements the secure transfer separately in the next step.

Secure transfer of the credential (step 232) may start with a process of the mobile library 82 listening for a signal advertisement such as Bluetooth low energy (BTLE) advertisements from in-range access controls 16. That is, the access controls 16 are advertising their presence on a periodic rate with advertisement data that indicates an identifier of the access control 16 and the mobile device 12 can listen and connect automatically without the person having to push a button to wake-up a sleeping, battery powered lock 16 or to get out of a vehicle to interact with a reader access point on a garage door or other device. The reader access point is another type of lock 16. Another embodiment is to use Near Field Communication (NFC) and the person 'taps' their mobile device to the lock 16 and a secure credential exchange transfers the mobile credential to the access control 16 (step 232). Secure credential exchanges can be done using standard techniques such as establishing a session key, encrypting communication messages, and validating the authenticity of message sender and receiver.

In the preferred embodiment where the access control advertises using Bluetooth low energy (BTLE), the mobile library 82 filters the received advertisements based on, for example, the received identifier of the access control 16 and by comparing with identifiers contained in or associated with each credential in the list of mobile credentials and based on the user intent to access a particular room. Once an advertisement is received for a target access control 16, the mobile library 82 initiates a wireless connection, and performs a secure transfer of the encrypted mobile credential (step 232). The secure transfer may utilize a unique session encryption key and standard cryptographic algorithms and techniques. It should be appreciated that the data can be securely transmitted over any wireless link, to include but not be limited to BTLE, zigbee, Near Field Communication, etc.

The credential module 36 will receive the encrypted mobile credential, then validate and decrypt the encrypted mobile credential to retrieve the virtual card data. The decryption and validation may include, but not be limited to, validating a digital signature, validating the type of the credential, validating that the credential identifier matches an identifier in the lock memory 32, validating a starting date and an expiring date of the credential, validating the source of the credential, etc. (step 118; FIG. 3). Once validated and decrypted, the virtual card data is extracted (step 120; FIG. 3).

The virtual card data is then communicated via hardware and software interfaces, depending on embodiments, to the lock controller 24 which may further decrypt the virtual card data, processes the data based on lock vendor rules, then open the lock if entry is permitted (step 234). Notably, the virtual card data is communicated into the lock controller 24 as a "virtual card read" in a data format equivalent to that of a physical key card. This thus permits the continued usage of traditional guest key cards 92 such as that of a family member, or a guest that just wants a copy of the physical key card 92, along with usage of the mobile device 12.

The audit trail uploaded by the mobile device 12 can be just the audits generated by the mobile device 12 itself, or can be the unified audits including openings by the guest using a physical key card. In addition, when the lock 16 is opened, a battery status or other maintenance information thereof may be uploaded into the audit trail from the mobile device 12 to the credential service 70 so that the hotel can be notified of low battery conditions and proactively change the batteries, or perform other maintenance. Other information associated with the audit trail can include, for example, failed openings or failed attempts or credentials that failed validation.

Usage of the "virtual card read" maintains a contiguous audit trail and also maintains all the known use cases for access control that are already encoded into traditional card data. Furthermore, the credential module 36 is lock vendor agnostic, so that any lock vendor's data could be passed through to allow each lock vendor to independently innovate card data. Further, the credential module 36 may be supplied by a different company than the lock 16. And also, the server 14, mobile device 12, and credential module 36 may have no means for further decrypting or validating the card data other than treating it like a data object to be encoded, encrypted, transferred, retrieved and delivered. Additionally, the "virtual card read" can be used offline without requiring the mobile device 12 to be online with a Wi-Fi connection or real time connection to a credential service. That is, the data for the "virtual card read" is stored on the mobile device 12 and passed securely to the credential module 36 in an offline mode. This is not to limit the capability to also send the "virtual card read" in an online mode. An additional benefit is that any access controls 16 can use any card types in addition to using a credential module 36, where the card types include but are not be limited to, Magnetic strip, RFID, Proximity, etc.

In another disclosed non-limiting embodiment, the credential module 36 can be used for many purposes, to include, but not be limited to, passing data to a self-service hard-key dispenser unit 98 that produces physical key cards 92. The hard-key dispenser unit 98 has a credential module 36 that receives the virtual card data, decrypts, extracts and sends to a lock controller 24 configured to encode the data onto a physical key card 92. That is, the virtual card data on the mobile device 12 is written to a physical key card 92 by the unit 98 and dispenses the key card 92 in an automated manner. The unit 98 does not require any user interface besides the dispensing element for the key card 92 and a unit power source, including but not limited to batteries, mains power, energy harvesting, and the like. The user interface for the unit 98 is really the interface of the mobile device 12. When the unit 98 begins to run low on blank key cards 92, the mobile device 12 can upload to the credential server 70 an indication of the status that can be turned into a report to notify the hotel that the unit 98 needs to be refilled.

In other disclosed non-limiting embodiments, the virtual card data can be standard access control card data (i.e. identification data) for badge access systems, or integrated into a vending machine with the virtual card data as credit card information, tokens, purchase reference identifiers, or the like.

Figure 5:
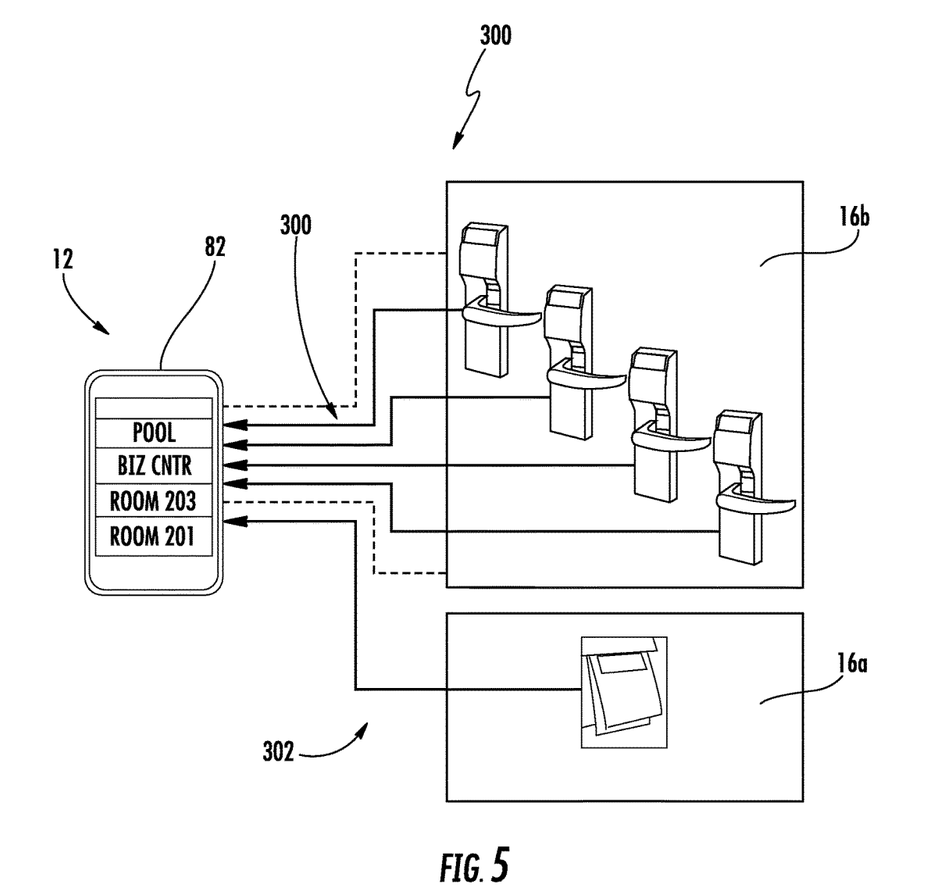
FIG. 5 is a schematic view of a credential according to another disclosed non-limiting embodiment.

With reference to FIG. 5, the mobile library 82 may include a set of mobile credentials that were generated by the credential service 70 based on access categories 300 (implicit permission) in addition to the mobile credential with virtual card data (explicit permission) 302 that was generated by the credential service 70 for a specific access control 16*a*. The access categories 300 operate to grant the user access to a particular grouping of access controls 16*b* that have collective meaning. For example, one access category could be 'Public Rooms' for access to a pool, business center, elevator, and wall readers. In the context of a hotel reservation, when the mobile device 12 communicates with the credential service 70 to download the encrypted mobile credential, the credential service 70 generates credentials for each lock in one or more access categories that the guest has been granted access. The encrypted mobile credential will thus have the same virtual card data encoded specifically for each specified access point, e.g., pool, business center, etc. and may optionally have the access category downloaded in or with the credential. However each mobile credential will be encrypted separately with a unique key for each access control 16*b*.

Provision and use of the access category 300 by the credential service 70 facilitates the efficient management of multiple access controls 16*b* in a system where the mobile device 12 can open multiples of locks where the mobile device 12 has a specific credential for each lock. This is simpler when compared to that which is conventionally required, e.g., two access control systems—one for the hotel system that generates the virtual card data with all the current art for hotel system access business rules, and a second one for granting access with a mobile credential to each access point, e.g., guest room, wall readers, pool, business lounge, etc. In other words, the business rules for the hotel system would need to be duplicated in the credential service.

The access category 300 allows for multi-vendor integration and can work separately from the hotel system access business rules that get encoded into virtual card data. The mobile credentials are thus an additional 'layer' of security "on top" of the virtual card data. The access category 300 also allows for relatively more simple maintenance procedures, such as, for example, when a lock in the 'Public' Access Category is replaced, the replacement lock need only be assigned to the same access category. However, a mobile device 12 would still need to communicate again to the credential service 70 for a new set of mobile credentials to be downloaded. No further administration is required on the part of the guest or system besides including the replacement lock in the correct access category and all guest permissions will continue to work seamlessly without modification even though the new lock has unique encryption keys from the prior lock.

Figure 6:
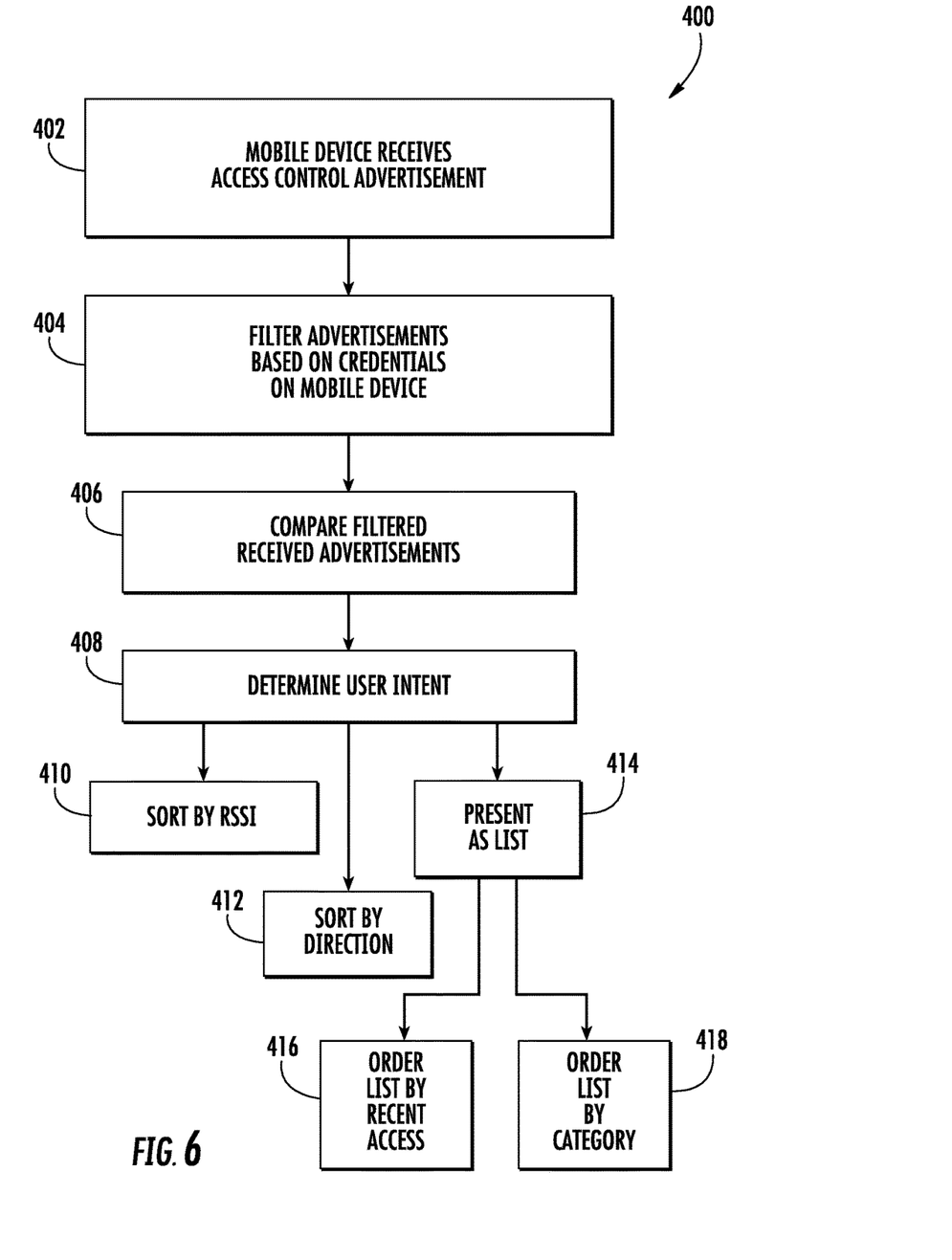
FIG. 6 is a flowchart of a advertisement filtering method according to one disclosed non-limiting embodiment.

With reference to FIG. 6, in another disclosed non-limiting embodiment, a method 400 of advertisement filtering may be initiated to capture the user intent when presented with multiple accessed controls 16. Initially, each access control 16 advertises using Bluetooth low energy (BTLE) which is received by the mobile device 12 (step 402). Advertisements from multiple access controls 16 can be received because they are all in proximity to the mobile device 12 or they are transmitting at a high enough power that they are within a distance from the mobile device 12 to be received.

Next, the mobile library 82 filters the received advertisements based on the downloaded set of credentials (step 404). That is, the received advertisements not associated with the set of credentials downloaded to the mobile device 12 are filtered out. In this way, any access controls 16 that the user is not permitted access rights are not even provided in a selection list or in the reduced set of possible locks to open. This filtering can be done based on an identifier contained in the access control 16 advertisement message and matching this identifier against an identifier contained in or associated with a credential stored in mobile device 12.

The mobile library 82 on the mobile device 12 then compares the identifiers contained in, or associated with, each credential in the filtered list of mobile credentials to determine the user intent to access a particular access control (step 406). Typically, only the user's room will remain within range once the filter is performed such that the user's intent is determined (step 408).

Alternatively, or in addition, if the filtered set of credentials still has more than one lock within range, then the filtered set of credentials may be sorted by RSSI (received signal strength indicator) or by an average of the RSSI (step 410). Sometimes the RSSI for a single advertisement may not be accurate due to radio frequency propagation characteristics (e.g. multi-path, interference, etc.) so an averaging function of more than 1 advertisement may be used to reduce the probability of error on a single reading"—want to enable an averaging of the RSSI in addition to a single reading of the RSSI. The access control with the highest signal strength is thus presumably closest to the person, and thus the user's intent. Further, if the mobile device 12 is utilizing a locating system such as GPS where the precise location of the mobile device relative to access control 16 is known, then the location and distance to the access control can be used to determine the nearest access control 16.

Alternatively, or in addition, the mobile device 12 may include a directional capability, e.g., compass and/or triangulation on a Bluetooth signal. For example, the mobile device 12 may include multiple Bluetooth antennas and the capability to determine the direction of the BTLE advertisement relative to the direction of the mobile device 12 using known methods in the art of wireless communications and antennas, or based on a separate locating system where the precise location of the mobile device relative to access controls 16 is known, the compass can be used to determine which of the access controls 16 the mobile device 12 is pointed at.

Thus, if the filtered set of credentials still has more than one lock within range, a user will typically point the mobile device 12 at the lock they intend to open and thus the direction can be utilized to further sort the filtered set of credentials (step 412) and determine the access control associated with the user's intent.

Alternatively, or in addition, the filtered set of credentials may be presented to the user as a list, e.g., ROOM 1125, ROOM 1127, Concierge Lounge, Elevator, etc., (step 414). The user may thus select the desired access control to open from the list. The list may be ordered in various ways, to include, the last access control opened such that, for example, the user's room will likely be at the top of the list after an initial access (416). The user can select from the list by tapping on the screen, or by responding with 'yes' or 'no' to voice prompts reading the rooms, or by a voice recognition algorithm that matches their vocal request against the filtered list of available rooms. Alternatively, or in addition, they could also use gestures to scroll through the list and select the desired room. The gesture would indicate to the mobile device 12 which direction to scroll the list and a separate gesture could be used to then indicate the selection, e.g. rotating the phone side-side, a quick acceleration or other gesture. The benefit of voice prompts or gesturing over tapping is that these operations can be done with one hand, e.g. tipping the device away would scroll the list down and tipping the device towards would scroll the list up, or other such gestures. In a case when a user has, for example, multiple concurrent hotel room reservations that provide access to the same access category and set of doors concurrently with multiple reservations, i.e., pool, side doors, etc., the confirmation number or other reference may also be included in the credential. So, with multiple credentials for the same lock, the user's 'stay' or 'confirmation number' may be used to also filter the list.

Alternatively, or in addition, the list may be selectively ordered by 'category', i.e., 'open my guest room'—and if the user only has one guest room, then filter out other locks that are not of this category, even though they are within range and permitted to open (step 418). For example, this may be performed by selecting a category icon on the mobile device 12, or by selection of pre-set preferences, e.g. "Public Door" to avoid inadvertently opening the room door along with a public access point because both are within Bluetooth range.

Figure 7:
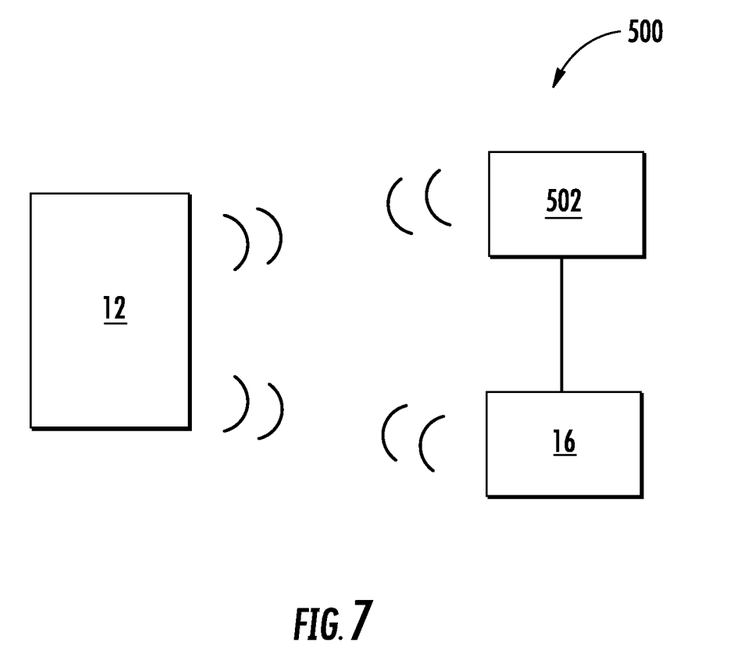
FIG. 7 is a schematic view of a filtering method according to another disclosed non-limiting embodiment.

With reference to FIG. 7, alternatively, or in addition, a secondary interface 500 may be utilized to provide additional information to the mobile device 12 to facilitate identification of the access control 16. In one example, an NFC (Near Field Communication) tag 502 may be associated with the access control 16 such that reading the NFC tag facilitates indication of which access control to communicate with over Bluetooth low energy (BTLE). As Bluetooth low energy (BTLE) has a relatively long range and may bounce in various manners, such a secondary interface facilitates proper proximity selection. A NFC tag, for example, could be affixed relative to the access control 16 so that by 'tapping' their mobile device 12 to the lock, it reads the credential identifier from the tag that is therefore associated with a specific access control 16. It should be appreciated that other information may alternatively or additionally be utilized such as image recognition of room numbers using a camera on the mobile device, altitude to determine which floor the mobile device 12 is on, etc. It should be appreciated other secondary interfaces 500 such as iBeacon, a barcode, or QR code printed on the lock that can be read by the mobile device 12 camera to determine an identifier associated with access control 16.

Advertisement filtering facilitates interaction between the user and the access control 16 as there is no need to 'turn the lock on.' Additionally, there is a benefit that the user can interact at a distance from a lock. An example is a parking garage locking point where traditionally a user had to open a window or exit a vehicle to use a card on a reader terminal to open the gate.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method of Bluetooth Low Energy (BTLE) advertisement filtering to determine a particular access control, comprising:
   receiving Bluetooth Low Energy (BTLE) advertisements from each of a multiple of access controls on a mobile device;
   filtering the Bluetooth Low Energy (BTLE) received advertisements based on a credential on the mobile device;
   comparing the filtered received Bluetooth Low Energy (BTLE) advertisements;

sorting the filtered received Bluetooth Low Energy (BTLE) advertisements based on a RSSI (received signal strength indicator);

determining a user intent to open the particular access control in response to the comparing and the sorting while the particular access control is within range of the mobile device; and opening the particular access control in response to the user intent.

2. The method as recited in claim 1, further comprising sorting the filtered received Bluetooth Low Energy (BTLE) advertisements based on a locationing system separate from the advertisement where the precise location and distance relative to the access control is known.

3. The method as recited in claim 1, further comprising sorting the filtered received Bluetooth Low Energy (BTLE) advertisements based on a direction of the mobile device.

4. The method as recited in 3, further comprising determining the direction by a compass on the mobile device.

5. The method as recited in claim 3, further comprising determining the direction via triangulation with dual Bluetooth antennas on the mobile device.

6. The method as recited in claim 1, further comprising presenting the filtered received Bluetooth Low Energy (BTLE) advertisements as a list on the mobile device for selection by the user.

7. The method as recited in claim 6, further comprising permitting scrolling of the list and selecting from the list based on gesturing with the mobile device.

8. The method as recited in claim 6, further comprising permitting filtering of the received Bluetooth Low Energy (BTLE) advertisements by the altitude of the mobile device.

9. The method as recited in claim 6, further comprising sorting the list based on one or more categories.

10. The method as recited in claim 6, further comprising sorting the list based on a prior selection.

11. The method as recited in claim 6, further comprising sorting the list based on the last access control opened.

12. The method as recited in claim 1, further comprising a secondary interface to provide additional information to the mobile device wherein the additional information includes information from a NFC (Near Field Communication) tag.

13. The method as recited in claim 12, wherein the NFC (Near Field Communication) tag is associated with each of the multiple of access controls.

14. The method as recited in claim 1, wherein further comprising a secondary interface to provide additional information to the mobile device, the additional information includes information from a barcode or QR code associated with each of the multiple of access controls.

* * * * *